Figure 1:
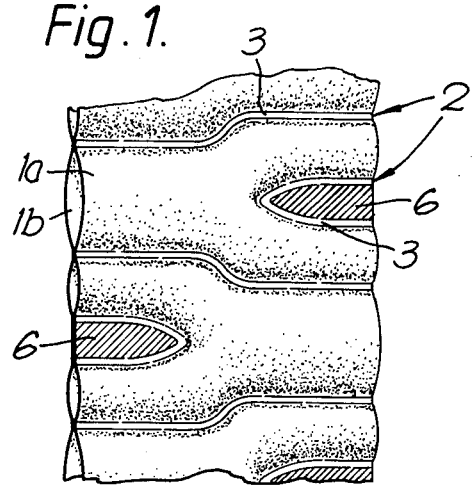

United States Patent [19]

McLoughlin

[11] 4,425,174

[45] Jan. 10, 1984

[54] METHOD OF MAKING HEAT SHRINKABLE ARTICLES

[75] Inventor: Robert H. McLoughlin, Highworth, Nr. Swindon, England

[73] Assignee: Raychem Limited, England

[21] Appl. No.: 302,887

[22] Filed: Sep. 16, 1981

[30] Foreign Application Priority Data

Sep. 17, 1980 [GB] United Kingdom ............... 8030020

[51] Int. Cl.$^3$ .................. B29D 23/00; B32B 31/04
[52] U.S. Cl. ........................... 156/218; 156/85;
156/86; 156/229; 156/243; 156/244.13;
156/244.14; 156/272.2; 156/290; 156/292;
174/DIG. 8
[58] Field of Search ............... 156/84, 85, 86, 229,
156/243, 244.13, 244.22, 290, 292, 272.2, 218,
244.14; 174/DIG. 8; 53/442; 264/230, 342 R,
342 RE

[56] References Cited

U.S. PATENT DOCUMENTS

| | | |
|---|---|---|
| 3,087,845 | 4/1973 | Patterson . |
| 3,106,441 | 10/1963 | Harrison et al. ............... 53/442 |
| 3,126,680 | 3/1964 | Baird et al. ............... 53/442 |
| 3,565,983 | 2/1971 | Eigenmann . |
| 4,020,141 | 4/1977 | Quinn et al. . |
| 4,059,478 | 11/1977 | Hoffman . |
| 4,275,180 | 6/1981 | Clarke . |
| 4,284,448 | 8/1981 | Popp et al. . |
| 4,288,107 | 9/1981 | Schwartze . |
| 4,310,367 | 1/1982 | Berejka ............... 156/85 |
| 4,342,800 | 8/1982 | Changani et al. ............ 156/218 |
| 4,345,957 | 8/1982 | Changani et al. ............ 156/218 |

FOREIGN PATENT DOCUMENTS

| | | |
|---|---|---|
| 7612791 | 4/1962 | Fed. Rep. of Germany . |
| 2143612 | 3/1972 | Fed. Rep. of Germany . |
| 2810708 | 9/1979 | Fed. Rep. of Germany . |
| 2855076 | 5/1980 | Fed. Rep. of Germany . |
| 990235 | 4/1965 | United Kingdom . |
| 1010064 | 11/1965 | United Kingdom . |
| 1116878 | 6/1968 | United Kingdom . |
| 1284082 | 8/1972 | United Kingdom . |
| 1286460 | 8/1972 | United Kingdom . |
| 1294665 | 11/1972 | United Kingdom . |
| 1357549 | 6/1974 | United Kingdom . |
| 1365932 | 9/1974 | United Kingdom . |
| 1550816 | 8/1979 | United Kingdom . |
| 2019412 | 10/1979 | United Kingdom . |
| 8024620 | 7/1980 | United Kingdom . |
| 8024621 | 7/1980 | United Kingdom . |
| 8024622 | 7/1980 | United Kingdom . |

OTHER PUBLICATIONS

Neue Deliwa-Zeitschrift Heft 2/71, pp. 49-51.

Primary Examiner—Caleb Weston
Attorney, Agent, or Firm—James W. Peterson; Herbert G. Burkard

[57] ABSTRACT

A process for the production of a heat shrinkable article which comprises forming bonds between regions of at least two superimposed lengths of polymeric material to produce a bonded article so disposed that the desired direction of heat shrinkability lies along the length of the bonded article, cross-linking the bonded article and the bonds between the said lengths of polymeric material, heating the bonded article, stretching the bonded article longitudinally and cooling it (which may comprise allowing it to cool naturally in the stretched condition) to render the articles heat shrinkable. Pneumatic or other methods of expansion may be used in addition to the stretching to render hollow articles heat-shrinkable, the combination of stretching and another such method being advantageous in achieving high expansion ratios while maintaining a reasonable degree of symmetry in the finished hollow recoverable articles.

11 Claims, 7 Drawing Figures

METHOD OF MAKING HEAT SHRINKABLE ARTICLES

The present invention concerns heat-recoverable articles, especially hollow articles, the dimensional configuration of which may be made to change by subjecting to heat, and in particular, to a process for the manufacture of such articles.

Hitherto, heat-recoverable articles have generally been produced by forming a polymer into the desired heat stable configuration, simultaneously or subsequently cross-linking the polymer in its heat stable configuration, heating the article to a temperature above the crystalline melting point or softening point of the cross-linked polymer, deforming the article and cooling the article whilst in the deformed state so that the deformed configuration is retained. In use, since the deformed state of the article is heat unstable, application of heat will cause the article to revert or tend to revert to its original heat stable configuration.

When articles are of such configuration that they cannot be produced directly by extrusion, for example electrical boots, udders (a term employed herein in a general sense to cover any hollow heat shrinkable article comprising at least three outlets employed in the termination of electrical cables and also commonly referred to as cable "breakouts") or end-caps (a hollow tubular article having a smoothly tapering sealed end) for electric cables, then hitherto such articles have generally been formed into the desired heat stable configuration on an item-by-item basis by moulding, e.g. by injection, compression or transfer moulding techniques.

Quite apart from the added expense of such techniques, for complicated shapes, e.g. udders, distortion may be necessary to remove the articles from the moulding pin or core requiring that the articles be resiliently deformable. Furthermore, in order to render such articles heat-recoverable, such moulded parts have in general hitherto been heated and deformed into a heat unstable configuration on an item-by-item basis.

It is an object of the present invention to provide a process of producing heat-recoverable articles which obviates or reduces the above-mentioned difficulties.

Accordingly the present invention provides a process for the production of a heat shrinkable article which comprises forming bonds between regions of at least two superimposed lengths of polymeric material to produce a bonded article so disposed that the desired direction of heat shrinkability lies along the length of the bonded article, cross-linking the bonded article and the bonds between the said lengths of polymeric material, heating the bonded article, stretching the bonded article longitudinally and cooling it (which may comprise allowing it to cool naturally) in the stretched condition to render the article heat shrinkable. Pneumatic or other methods of expansion may be used in addition to the stretching to render hollow articles heat-shrinkable, the combination of stretching and another such method being advantageous in achieving high expansion ratios while maintaining a reasonable degree of symmetry in the finished hollow recoverable article.

The lengths of polymeric material to be bonded together, preferably by fusion bonding, may for example comprise two discrete and separate polymeric webs, the two flaps of a longitudinally folded polymeric web or the opposed sides of a collapsed polymeric tube.

By the expression "fusion bonding" as employed herein is meant a process wherein the material in the parts to be bonded together is caused to flow to form the bond, e.g. welding by heat, solvent or ultrasonic or radio frequency energy, preferably with the application of pressure, either to form a bridge from the materials of the respective lengths of polymeric material or to fuse the parts with further material which is cross-linked with the material of the said parts by the cross-linking step of the process.

The preferred direction of heat shrinkability of the hollow articles is radially inwardly thereof. Accordingly, if it is desired to produce heat recoverable tubular articles, then preferably such articles are disposed transversely of the length of the polymeric material in side-by-side relationship to impart radially inward heat shrinkability, the preferred articles being recoverable substantially only in the radial sense (e.g. preferably less than 10% recoverability in the longitudinal sense).

The process is applicable to both crystalline and non-crystalline polymers, the softening point, by which is meant the crystalline melting point for crystalline polymers, being selected accordingly as the minimum deformation temperature.

By "fusion bondable" polymeric materials as employed herein is meant not cross-linked, or cross-linked only to the extent that the material can still be readily bonded to itself or to another polymeric component by fusing.

In general, the level of cross-linking in the polymeric material expressed in terms of gel content (ANSI/ASTM D2765-68) is preferably less than 40%, more preferably less than 20%, particularly less than 5%. When cross-linking in accordance with the process, preferably gel contents of at least 40%, e.g. at least 50%, particularly at least 65% are attained.

Of particular interest is a process whereby the lengths of superimposed polymeric material to be bonded together are at a temperature at or above the crystalline melting point or softening point of the polymer. The preferred temperatures are typical of the temperatures of such materials shortly after issuing from an extruder, and for this reason, the process of invention preferably includes in-line extrusion of the polymeric lengths prior to fusion bonding. When the lengths of polymeric material at such temperatures are employed, then it has been found that the fusion step is facilitated and may be accomplished by the application of localised pressure if necessary with further heating.

Heat-recoverable articles produced by the process of the invention also form part of the present invention.

The process is particularly useful in the manufacture of heat-recoverable boots, transitions, udders and end-caps for electrical applications, e.g. electrical cables, the use of such products being extensive and well reported in the literature e.g. Proc. IEE 1970, 117(7), 1365 1372 as well as the products described in British patent application No. 80.24621 the disclosure of which is incorporated herein by reference.

Such products may, for example, be produced in accordance with the process of the invention by welding together at least two super-imposed pre-stretched polymeric webs, or the two super-imposed flaps of a single folded pre-stretched polymeric web or the super-imposed sides of a pre-stretched and flattened polymeric tube. In the case of e.g. boots, udders and end-caps, the direction of heat shrinkability is preferably radially inward in relation to the substrate to which they are applied and, more preferably, in the substantial absence of shrinkage longitudinally in relation to said substrate.

Heat recoverable articles produced in accordance with the process of the invention may advantageously be coated internally with an adhesive or sealant, in analogous manner to that described and claimed in UK Application No. 80.24622 filed on July 8, 1980, e.g. an adhesive such as a hot-melt adhesive or a sealant (such as described in U.K. Pat. No. 1,116,878 the disclosure of which is incorporated herein by reference). The application of the adhesive or sealant may be effected before, during, or after the process of the invention by appropriate choice of adhesive or sealant and process conditions. For example, a hot-melt adhesive or sealant may be applied to the fusion bondable polymeric materials before the fusion step and thereafter the parts to be fused together locally heated and pressed together to displace the adhesive or sealant locally in the regions to be fused together. Alternatively, the adhesive or sealant may be applied after the bonding step.

If self-adhesion of adhesive or sealant-coated contacting parts is a problem, then such parts may be separated by a non-adherable material such as release paper.

Any fusion-bondable polymeric material to which the property of dimensional recoverability may be imparted such as those disclosed in U.K. Pat. No. 990,235 may be used to form the articles. Polymers which may be used as the polymeric material include polyolefins such as polyethylene and polypropylene, and ethylene copolymers, for example with propylene, butene, hexene, octene, vinyl acetate or other vinyl esters or methyl or ethyl acrylate, polyamides, polyurethanes, polyvinyl chloride, polyvinylidine fluoride, or other fluorinated polymers or copolymers, e.g. Tefzel (trade name-commercially available from Dupont), elastomeric materials such as those disclosed in U.K. Pat. No. 1,010,064 and blends such as those disclosed in U.K. Pat. Nos. 1,284,082 and 1,294,665, and compositions such as those disclosed in our U.S. Pat. No. 4,275,180 and British patent application No. 2,019,412. The polymeric materials can be tailored to suit the intended use by the addition of fillers, e.g. semi-conducting fillers or anti-tracking agents, flame retardants, plasticisers, pigments, stabilisers and lubricants, or where necessary, e.g. where the polymeric material is substantially non-crystalline, a hold-out agent such as a thermoplastic polymer, e.g. polyethylene, may be included in the material.

The polymeric material may be cross-linked by irradiation, for example, by means of an electron beam or by gamma radiation or it may be chemically cross-linked. Whichever cross-linking process is used, it may be advantageous to incorporate one or more co-curing agents for example polyunsaturated monomers such as triallyl cyanurate, triallyl isocyanurate, diallyl phthalate, ethylene glycol dimethacrylate, trimethylolpropane trimethacrylate, pentaerythritol tetramethacrylate, allyl methacrylate and vinyl methacrylate.

One method of chemical cross-linking that may be used in the process according to the invention involves grafting an unsaturated hydrolysable silane on the polymer and subjecting the article to moisture during a curing stage, for example, as described in U.K. Patent specification Nos. 1,286,460 and 1,357,549.

Any of the techniques conventionally employed for fusing together polymeric materials may be employed in the process of the present invention, e.g. radio frequency, ultrasonic or hot bar welding, and pressure may additionally be applied to ensure a satisfactory bond.

As hereinbefore indicated, however, it is preferred that the lengths of polymeric material to be fused together are at an elevated temperature.

If the heat-recoverable article is produced with an undesired protruding external weld seam, then this may be avoided by turning the article inside-out.

As hereinbefore described, the process is particularly appropriate in the production of hollow heat-recoverable articles for use in the electrical field, e.g. boots, udders and end-caps. In general, such products are characterised by a wall thickness before heat-recovery thereof of preferably from 0.1 to 5 mm, especially from 0.5 to 3 mm e.g. 1 to 3 mm.

Figure 2:
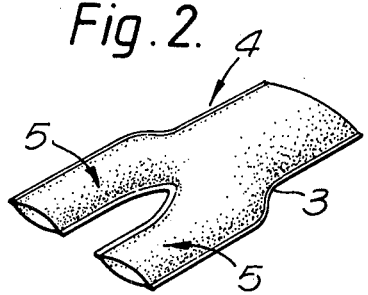
Figure 3:
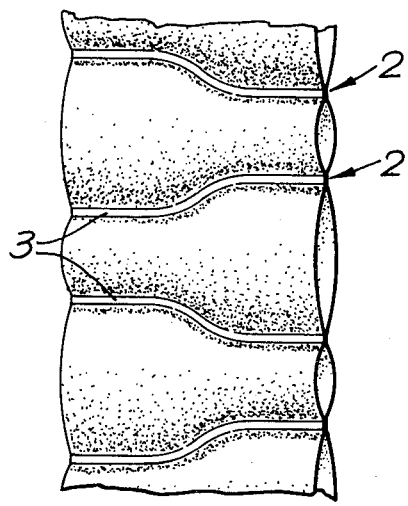
Figure 4:
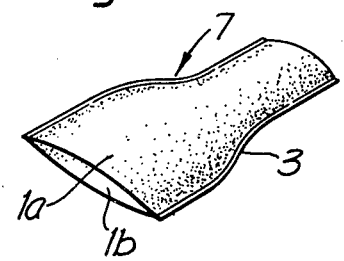
Figure 5:
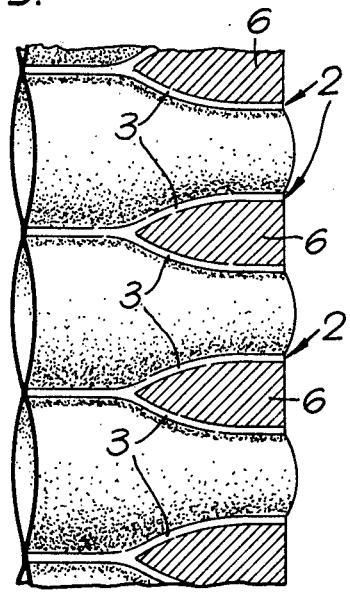
Figure 6:
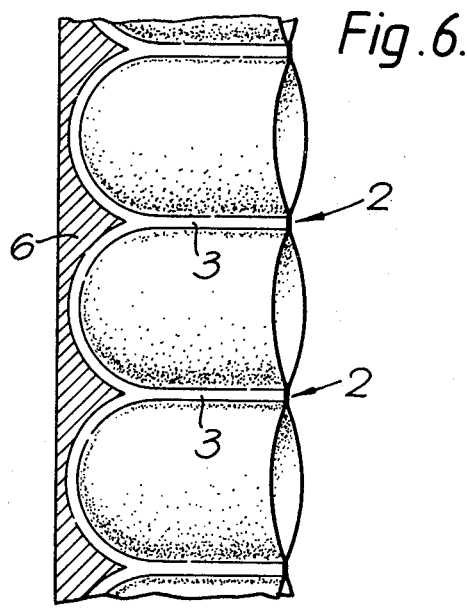
Figure 7:
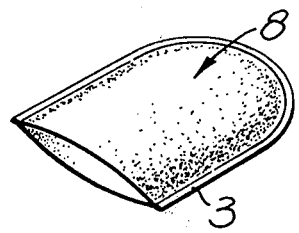

Specific embodiments of the process of the invention will now be described by way of example with specific reference to the accompanying drawings wherein:

FIG. 1 is a schematic top view of an assembly of separable heat-recoverable udders for the termination of an electrical cable, FIG. 2 is a diagrammatic isometric view of an udder produced from the assembly shown in FIG. 1, FIG. 3 is a schematic top view of an assembly of separable heat-recoverable boots employed for sealing an electrical cable at the termination thereof, FIG. 4 is a diagrammatic isometric view of a boot produced from the assembly of FIG. 3, FIG. 5 is a schematic top view of an alternative assembly of separable heat-recoverable boots from which the boot of FIG. 4 may be produced, FIG. 6 is a schematic top view of an assembly of separable heat-recoverable end-caps employed for sealing the ends of electrical cables, and FIG. 7 is an isometric view of an end cap produced from the assembly of FIG. 6, In the embodiment shown in FIGS. 1a, 1b, respectively and 2, a pair of polyethylene sheets 1 are produced by extrusion at a die temperature of 170° C. and passed between the nip of a heated pair of cooperable rollers (not shown) the temperature of the sheets at the nip being approximately 150° C.

One or each roller of the pair is provided with a raised pattern thereon so that on passage through the nip, the sheets become fused together at position 2 along a region depicted by reference numeral 3 to produce a series of seams defining a plurality of interconnected udders 4 arranged in side-by-side relationship. The bonded article so produced is then irradiated in an electron beam at a dosage of 15 Mrads. After crosslinking, the article is heated under an infra-red heater to a temperature of about 180° C., and at this temperature passed between two sets of nip rolls, the second set of nip rolls moving faster than the first such that the material is stretched longitudinally by a factor of 4. The material is cooled to a temperature below 100° C. whilst maintained in the stretched condition. Thereafter, the individual, now heat recoverable, udders 4 are severed from the article, each udder having two legs 5 defined by the weld 3, and the areas of the length depicted by reference number 6 discarded.

Such udders may be employed in the electrical termination of a cable comprising two primary wires by heat recovering the udder about the end of the cable, the primary wires passing through the legs of the udder.

In a modification (not shown) of the above embodiment the sheets are internally pre-coated with a sealant or adhesive such as a hot-melt adhesive before the welding stage. The sealant or adhesive selected is one that is relatively insensitive to the subsequent radiation treatment. Furthermore, the heated rollers engageable with the sheets cause the sealant or adhesive in the region to be welded to flow and be displaced immediately prior to the welding stage. The resulting product is thereafter treated in analogous manner to that described above.

In analogous manner to that described in relation to the first embodiment the transitions and end-caps shown in FIGS. 3, 4 and 5 and FIGS. 6 and 7 respectively are produced, the same reference numerals being employed for analogous parts.

In each of the preceding embodiments, the wall thickness of the polyethylene after deformation may be 0.1 mm, 0.5 mm, 1.0 mm, 1.5 mm, 2.0 mm, 2.5 mm, 3.0 mm, 3.5 mm, 4.0 mm, 4.5 mm and 5.0 mm with similar results.

In all embodiments of this invention, the fact that the polymeric material is cross-linked after the article has been assembled enables it to be cross-linked by irradiation, thereby reducing the time taken for cross-linking, obviating the necessity to incorporate peroxide or other chemical curing agents in the material, and strengthening the bonded regions. The latter feature is particularly significant when the first and second bodies have been bonded together by fusion and results in strong cross-linked bonded regions. The fusion bonding is preferably carried out under such pressure and other conditions as will cause a bead of fused material to be extruded along the edge of the bonded seam, thus indicating a high degree of flow of the bond material to enhance the effectiveness of the bonding.

I claim:

1. A process for the production of heat shrinkable articles which comprises:
   forming bonds between regions of at least two superimposed lengths of polymeric material to produce a bonded article comprising at least two hollow articles, at least part of each hollow article lying between two bonded portions disposed along the lengths of polymeric material, and each of the said bonded portions being disposed transversely of the lengths of polymeric material;
   cross-linking the hollow articles and the bonds between the said lengths of polymeric material;
   heating the hollow articles;
   stretching the lengths of polymeric material longitudinally; and
   cooling the hollow articles in the stretched condition to stabilise the hollow articles in a heat shrinkable state.

2. A process according to claim 1, wherein each hollow article is so disposed relative to the direction of the stretching of the lengths of polymeric material that at least the part of each hollow article lying between the two said bonded portions is rendered heat-shrinkable substantially only in a radial sense.

3. A process according to claim 2 wherein the hollow articles are of flattened tubular form and are disposed side-by-side along the lengths of polymeric material.

4. The process according to claim 1, wherein the bonding is effected by fusion of the said polymeric material. pg,15

5. A process according to claim 1 wherein bonds include further material in addition to the said lengths of polymeric material and the cross-linking cross-links the said further material with that of the said lengths.

6. The process according to claim 1, wherein the said two lengths of polymeric material are both parts of the same single body.

7. The process according to claim 1, wherein the polymeric material before the cross-linking step has a gel content as measured by test method ANSI/ASTM D2765-68 of less than 5%.

8. The process according to claim 1, wherein the cross-linking is effected by means of ionising radiation.

9. The process according to claim 1, wherein the heat-shrinkable article has a wall thickness of at least 0.1 millimeters.

10. The process according to claim 1, wherein the heat-shrinkable hollow articles have a wall thickness within the range from 0.1 to 5.0 millimeters.

11. The process according to claim 1, which is carried out continuously on continuous lengths of polymeric material.

* * * * *